United States Patent [19]
Watanabe et al.

[11] Patent Number: 5,173,119
[45] Date of Patent: Dec. 22, 1992

[54] COATING APPARATUS BASE FILM COATING APPARATUS WITH NOVEL DIE NOZZLE

[75] Inventors: Masaru Watanabe, Nishinomiya; Satoshi Hirose, Amagasaki, both of Japan

[73] Assignee: Matsushita Electric Industrial Co., Ltd., Osaka, Japan

[21] Appl. No.: 545,890

[22] Filed: Jun. 29, 1990

[30] Foreign Application Priority Data

Jun. 29, 1989 [JP] Japan .................................. 1-169297

[51] Int. Cl.⁵ .............................................. B05C 5/02
[52] U.S. Cl. .................................... 118/410; 118/419
[58] Field of Search ............... 118/410, 419; 427/356, 427/357, 358

[56] References Cited

U.S. PATENT DOCUMENTS

| | | | |
|---|---|---|---|
| 4,424,762 | 1/1984 | Tanaka et al. | 118/410 |
| 4,537,801 | 8/1985 | Takeda | 118/410 X |
| 4,995,339 | 2/1991 | Tobisawa et al. | 118/410 |
| 5,028,450 | 7/1991 | Naka et al. | 118/410 X |

FOREIGN PATENT DOCUMENTS 60-238179 11/1985 Japan .

OTHER PUBLICATIONS

Tosoh Kogaku–Coating Technology, vol. 21, No. 10, 1986.

Primary Examiner—Michael G. Wityshyn
Attorney, Agent, or Firm—Wenderoth, Lind & Ponack

[57] ABSTRACT

A coating apparatus is known in which a coating liquid is continuously delivered from the front-end slit of a die nozzle for application onto a base film which constantly runs without being supported from the back. The improvement is made in which the die nozzle has at the film loading side a front lip and at the film unloading side a rear lip provided at least with a convex surface, both of which being arranged in step relationship so that the slit side end of the front lip is set back from the path of the base film to locate lower than that of the rear lip. Thereby, a higher shear force will be exerted on the magnetic coating liquid temporarily trapped in a space defined by the running base film and the slit side end of the rear lip, thus allowing a smooth surfaced coating to be developed of a highly agglomerative coating material.

3 Claims, 5 Drawing Sheets

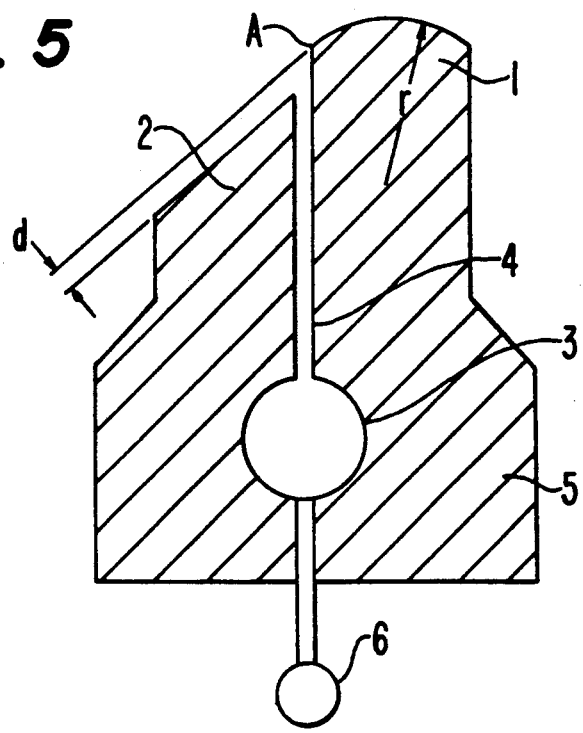
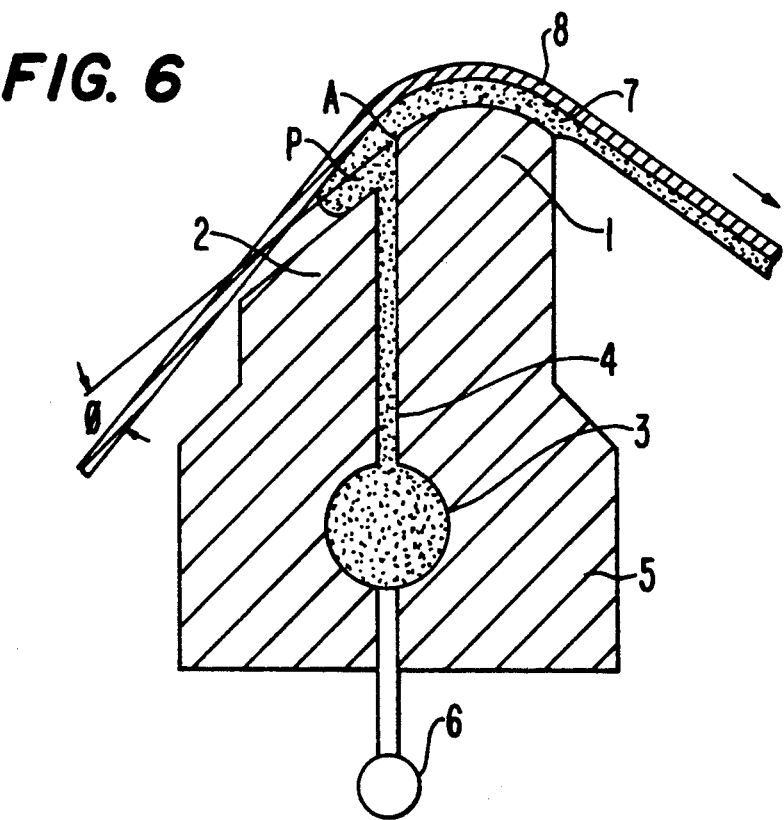

COATING APPARATUS BASE FILM COATING APPARATUS WITH NOVEL DIE NOZZLE

BACKGROUND OF THE INVENTION

1. Field of the Invention

The present invention relates to a coating apparatus for a magnetic recording medium, e.g. a magnetic tape and a floppy disk, and more particularly, to the improvement of a die nozzle of the same.

2. Description of the Prior Art

In the manufacturing process of a magnetic recording medium, there is a step of coating a plastic film with a magnetic layer and a back layer by the use of a coating apparatus having a die nozzle. It is generally known that as best shown in FIG. 8, such a die nozzle 5 delivers from the front-end slit thereof a flow of magnetic coating liquid 7 which is continuously supplied by a pump 6 and in turn, applied onto a base film 8 which runs without being supported from the back, while the clearance between the die nozzle 5 and the base film 8 is maintained constant by the pressure of the magnetic coating liquid. The die nozzle 5 has at the film unloading side a rear lip 1 thereof provided with a convex surface and at the film loading side a front lip 2 thereof, both of which are arranged so that the coating liquid in a liquid pocket P defined by the rear lip 1 remains under pressure during the coating procedure, whereby high-speed and uniform coating operations will be ensured. Another advantage of the die nozzle 5 is that the convex shape in cross section of the rear lip 1 allows no foreign matters to accumulate on the surface and thus, uneven coating which commonly occurs in stripe form during continuous long-run operations will be avoided.

However, we have found through experiments that during the coating of a base film with a particular coating liquid, e.g. a magnetic coating liquid, which has a thixotropic property exhibiting a dependency of viscosity on a shear velocity, by the foregoing prior art coating apparatus, there is a possible tendency to have a lengthwise stripe pattern of slightly uneven coating appearing on the coating surface, which is distinguished from the aforementioned conventional stripe-pattern coating fault.

FIG. 7-a illustrates the result of measurements of a coating surface, measured by a 3-dimension surface profile analyzer, which was prepared by coating a 14-μm-thick base film of polyethylene terephthalate with the magnetic coating liquid shown in Table 1 and then, finishing it with calendering. The resultant measurements on the coating surface are shown for clarity in the form of a graphic diagram in which the projections represent regions higher than the average value which is assigned as 0. As shown, the coating surface exhibits a stripe pattern of about 300 μm pitch coating inequality extending in the lengthwise direction of the base film, which is clearly different from that caused by the accumulation of foreign matters during the coating by the conventional coating apparatus. The average roughness on the coating surface (expressed by an RMS value hereinafter) shown in FIG. 7-a was 11.5 nm. The results measured in the magneto electric conversion using an MII format deck were −2 dB in the video frequency output (of 7 MHz) and −1 dB in the S/N ratio, as compared with our reference tape. This means that the stripe pattern on the coating surface shown in FIGS. 7-a causes a considerable decline in the magneto electric conversion.

We have also found through experiments the cause of the development of such a lengthwise stripe pattern, which will now be described. In magnetic coating liquid, particles of magnetic powder which are commonly present, likely in the form of primary particles, but forming a three-dimensional network structure due to the magnetic forces between the particles, will be converted into agglomerates having a certain size when a shear stress is applied to the structure (as depicted in a Japanese magazine "Tosoh Kogaku Coating Technology", Vol. 21, No. 10 issued in 1986). Particularly, in a magnetic coating liquid which contains powder of magnetic material having a small lengthwise diameter of the average particle and offering a high magnetic force, the presence of such agglomerates is of an order of several tens to a hundred micrometers during movement of the liquid which is thus increased in agglomeration. During the application of the highly agglomerative magnetic coating liquid onto a base film from the die nozzle, the agglomerates are forced out from the liquid pocket P, shown in FIG. 8, onto the rear lip, thus developing an unwanted stripe pattern.

It was also found out through experiments that the greater the magnetic force and the smaller the lengthwise diameter of average particle of the magnetic powder in a magnetic coating liquid, the more the stripe pattern of uneven coating appears.

Corresponding to the high-density recording on a magnetic recording medium, ultrafine magnetic powder exhibiting a high magnetic force has recently been employed. However, such a stripe pattern of uneven coating on the coating surface as described above tends to degrade the characteristics of magneto electric conversion including a video frequency output and an S/N ratio and thus, will cause a substantial defect in the product quality.

TABLE 1

| Iron powder | 100 parts |
| --- | --- |
| Lengthwise diameter of particle: 0.18 μm | |
| Average diameter ratio: 1:12 | |
| $\sigma s$ 128 emu/g | |
| Hc 1530 Oe | |
| Conductive carbon | 2 parts |
| Polyurethane resin | 10 parts |
| Vinyl chloride vinyl acetate copolymer | 10 parts |
| Alumina ($\alpha$-$Al_2O_3$) | 5 parts |
| Stearic acid | 2 parts |
| Butyl stearate | 2 parts |
| Methyl ethyl ketone | 200 parts |
| Toluene | 180 parts |
| Cyclohexanone | 40 parts |

SUMMARY OF THE INVENTION

It is an object of the present invention to provide a coating apparatus for manufacturing magnetic recording media having smooth coating surfaces with the absence of the aforementioned problems.

For solving the problems, a coating apparatus according to the present invention in which a coating liquid is continuously delivered from the front-end slit of a die nozzle for application onto a base film which constantly runs without being supported from the back, is provided allowing the die nozzle to have at the frontward (or film loading) side of the slit a front lip and at the rearward (or film unloading) side, a rear lip provided at least with a convex surface, both of which are arranged in step relationship so that the slit side end of the front lip is set back from the path of the base film as compared with that of the rear lip, thus forming a liquid pocket at the front lip side of the slit, unlike the prior art in which the liquid pocket is defined between the base film and the rear lip.

Accordingly, at the front lip side of the slit, a great shear force can be yielded and exerted on the magnetic coating liquid between the base film and the front lip, thus causing obstructive agglomerates in the magnetic coating liquid to be broken into smaller pieces and eliminating the development of a stripe pattern of uneven coating.

Also, with the use of the coating apparatus according to the present invention, a smooth surfaced coating can be built up from a highly agglomerative magnetic coating liquid which contains ultrafine magnetic particles exhibiting a high magnetic force and as the result, the quality of a high-density recording magnetic recording medium will be much improved.

BRIEF DESCRIPTION OF THE DRAWINGS

FIGS. 5 and 6 are cross sectional views of a coating apparatus showing a third embodiment of the present invention;

DESCRIPTION OF THE PREFERRED EMBODIMENTS

Preferred embodiments of the present invention will be described in conjunction with the accompanying drawings.

Figure 1:
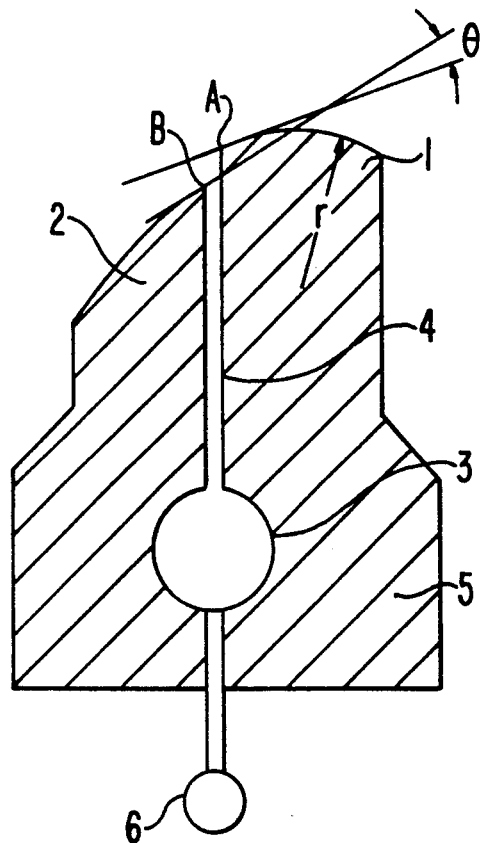
FIGS. 1 and 2 are cross sectional views of a coating apparatus showing a first embodiment of the present invention.

FIG. 1 is a schematic cross sectional view showing a coating apparatus according to the present invention, in which a rear lip 1 is provided with a convex surface having a curvature radius r of 2 to 20 mm. The curvature radius can be chosen depending on the viscosity of the magnetic coating liquid, the speed of coating, the thickness of the coating, and the tensile strength of the base film. The thickness of the rear lip 1 is also about 2 to 20 mm.

A front lip 2 is arranged so that the angle $\theta$ between two tangent lines at the points A and B is less than 45° where A is the slit end of the rear lip 1 and B is the slit end of the front lip 2. This resides in the following reason.

Figure 2:
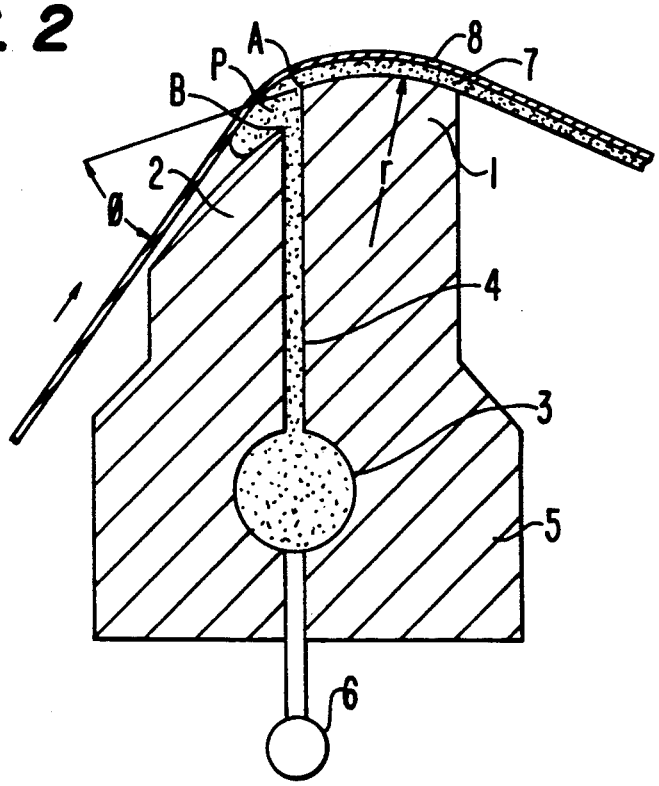

It is known that when the coating speed is more than 100 m/min or the thickness of a coating is less than 10 $\mu$m in wet state, the air accompanying the base film is mixed within the coating liquid delivered from the slit thus interrupting the operation of coating. As shown in FIG. 2, the loading angle of the base film onto the front lip 2 surface is chosen so that the angle $\phi$ between the base film path and the tangent line at the edge point A of the rear lip 1 is expressed as $0.5° < \phi < 5°$, whereby the coating liquid trapped in a liquid pocket P defined by the slit outlet and the front lip 2 will be kept under pressure and thus, the mixing of air into the coating liquid will be avoided. Hence, the development of a thin film having a thickness of less than 10 $\mu$m becomes feasible during coating at a high speed of more than 100 m/min. Accordingly, the base film is prevented from coming into direct contact with the surface of the front lip 2, allowing no scratch nor injury to the surface.

The front and rear lips are preferably made of carbide alloy metal so that their surfaces can be finished with an accuracy of the order of a few micrometers and also, the generation of burr at the slit edge of the rear lip 1 can be avoided. Accordingly, during the development of a thin coating, no widthwise variation in the thickness will occur and no stripe pattern of uneven coating on the coating surface caused by the existence of burr at the edge will be produced, ensuring the consistency of satisfactory coating.

A manifold 3 is also provided having a circular shape in cross section which is about 10 to 100 mm in inside diameter and extending in the direction of coating width throughout the die nozzle. The slit 4 in the die nozzle is substantially as narrow as 0.1 to 1 mm and its widthwise distance can be adjusted to a desired coating width. The length of the slit 4 from the manifold to the outlet end is determined depending on the viscosity of the coating liquid associated having the thixotropic property after coating, the delivery of the same from the die nozzle, and the like, and may be 20 to 100 mm for practical operations.

FIG. 2 is a schematic cross sectional view showing the application of a magnetic coating liquid in the coating apparatus according to a first embodiment of the present invention, in which a coating amount of the magnetic coating liquid 7 is continuously supplied by the pump 6 through the manifold 3 in the die nozzle 5 and forced out from the slit 4 by means of liquid pressure in the manifold 3 for application onto a base film. The magnetic coating liquid 7 delivered from the slit is then applied onto the base film 8 to form a layer having a given thickness while filling the liquid pocket P defined between the base film 8 and the front lip 2. The loading angle of the base film 8 onto the front lip 2 can be adjusted with a guide roll (not shown) provided on the film loading (or frontward) side of the die nozzle 5.

As described previously, the magnetic coating liquid 7 in the liquid pocket P contains agglomerates of magnetic particles. The clearance between the base film 8 and the slit end A of the rear lip 1 is about 10 to 30 $\mu$m, smaller than the size of the agglomerates and in addition, a high shear stress on the order of $10^5$ to $10^6$ (1/sec) due to the running velocity is exerted on the agglomerates at the clearance. As the result, the agglomerates are broken into smaller pieces and will no longer be conveyed to the rear lip 1. Hence, the development of a stripe pattern of uneven coating on the coating surface can be avoided.

Figure 7A:
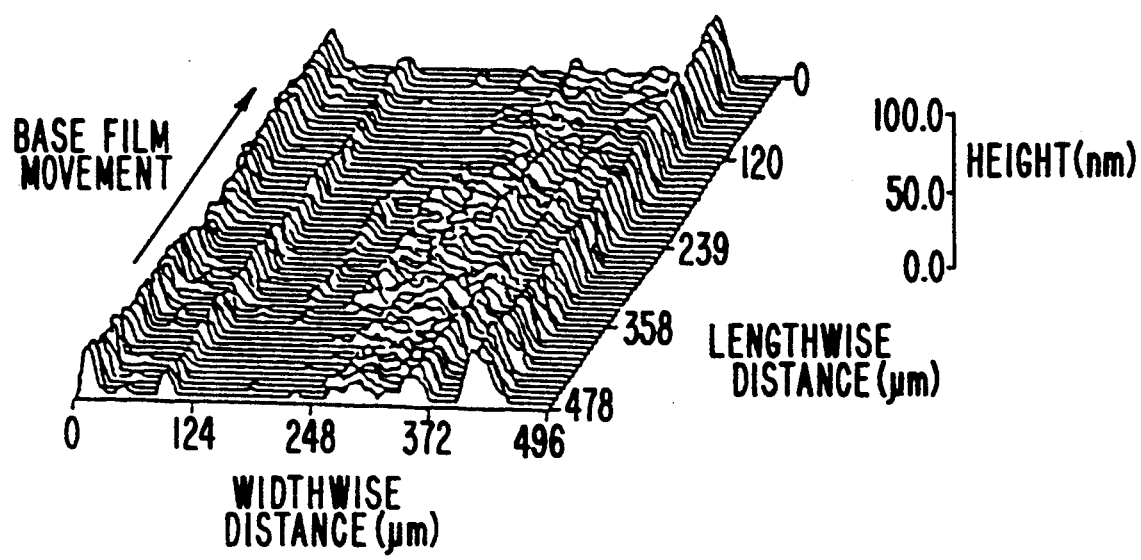
FIG. 7(A) and 7(B) are diagrams showing the resultant measurements of coating surfaces measured by a 3-dimension surface profile analyzer.
Figure 7B:
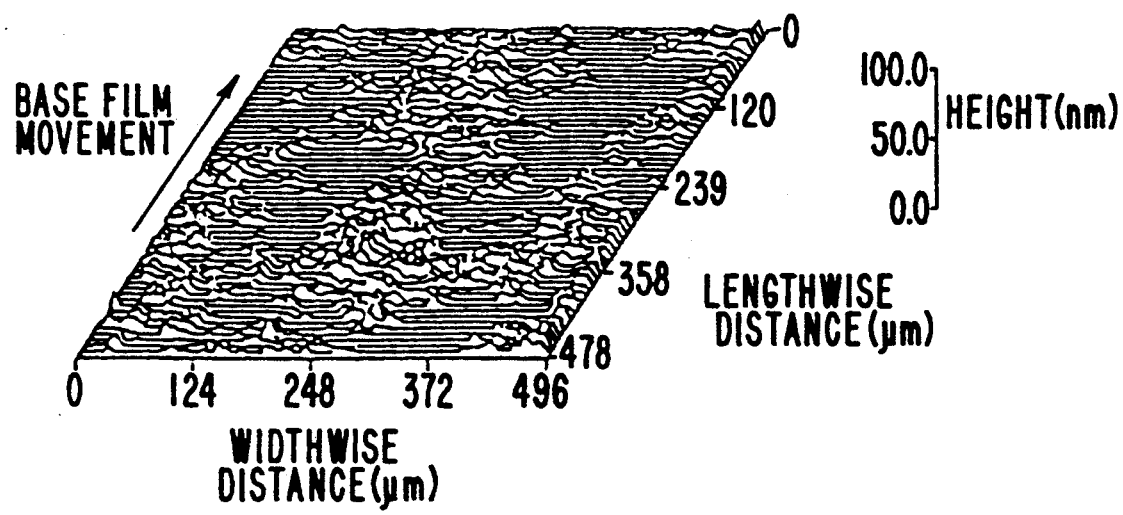
Figure 8:
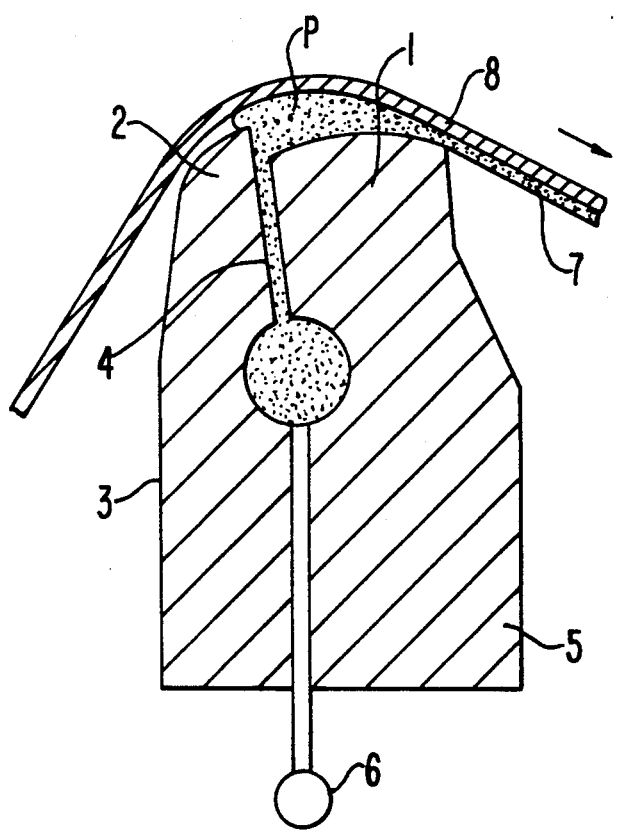
FIG. 8 is a cross sectional view of a prior art die nozzle.

According to this embodiment, the magnetic coating liquid shown in Table 1 was applied at a coating speed of 200 m/min onto a polyethylene-terephthalate film 14 $\mu$m thick to produce a tape finished with calendering. The surface of the tape was measured by a 3-dimension surface profile analyzer and the resultant measurements are shown in FIG. 7-b. None of the stripe pattern of uneven coating (FIG. 7-a) which is commonly seen on the coating surface made by the prior art die nozzle was developed.

Table 2 shows the resultant measurements of an output and an S/N ratio at a video frequency of 7 MHz in the magneto electric conversion, measured using the MII format deck and also, the average roughness (RMS) on the surface measured by a 3-dimension surface profile analyzer. As shown, the magnetic recording medium which was produced in the above manner has a lower RMS rate and is much improved in both the reproduction output and the S/N ratio than the existing tape made by the conventional die nozzle of a prior art coating apparatus, exhibiting a higher level of quality.

For comparison, the existing tape was fabricated by coating a 14 μm-thick polyethylene-terephthalate film with the magnetic coating liquid shown in Table 1 at a coating speed of 200 m/min using the conventional die nozzle of the prior art coating apparatus and finishing it with calendering. The resultant measurements on the surface of the tape measured by the 3-dimension surface profile analyzer is shown in Table 2. Also, shown in Table 2 are the output at the frequency of 7 MHz and the S/N ratio measured in the same manner as of the embodiment, in the respect of the magneto electric conversion. Table 2 also includes the RMS, output at the frequency of 7 MHz, and S/N ratio of a reference tape associated with our criteria.

TABLE 2

| | Characteristics in magneto-electric conversion | | Average roughness (RMS) |
|---|---|---|---|
| | S/N ratio | Video band output (7 MHz) | |
| Embodiment tape | +0.5 dB | +1.0 dB | 4.5 nm |
| Prior art tape | −1.0 dB | −2.0 dB | 11.5 nm |
| Reference tape* | 0 dB | 0 dB | 7.0 nm |

*For comparison, our MII format tape is used as the reference tape.

Figure 3:
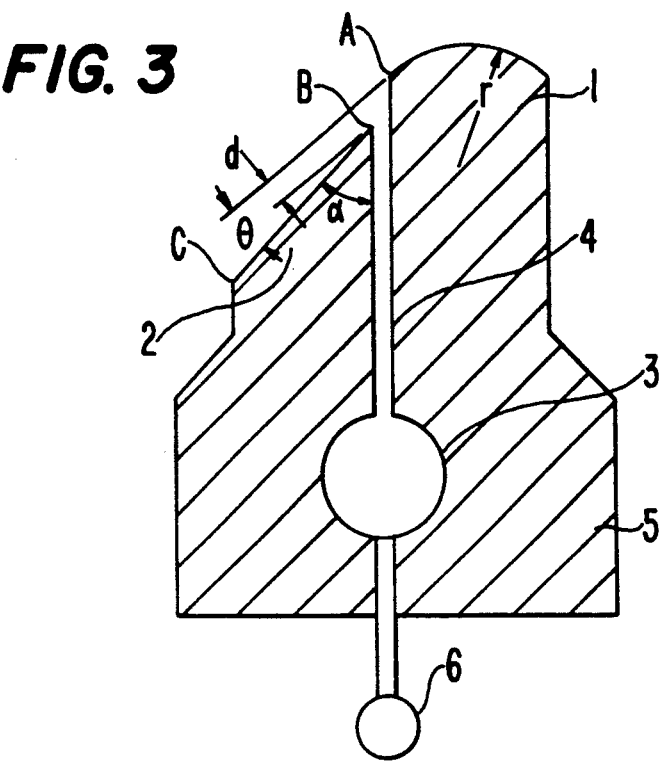
FIGS. 3 and 4 are cross sectional views of a coating apparatus showing a second embodiment of the present invention.

FIG. 3 is a schematic cross sectional view of a coating apparatus showing a second embodiment of the present invention, in which the front lip 2 has a different in the structural arrangement from the first embodiment. The front lip 2 has a base film surface formed with a planar configuration so that the angle $\theta$ between the line BC and the tangent line at the point A is expressed as $0 < \theta < 45°$ where A is the slit end of the rear lip 1, B the slit end of the front lip 2, and C the opposite end of the front lip 2. Additionally, the front lip 2 is arranged such that while no region thereof extends past a tangent line to the point A and extending towards the base film, its top end B is located 2 to 100 μm lower than the tangent line at the point A and recessed from the base film path. This is for the following reason.

Figure 4:
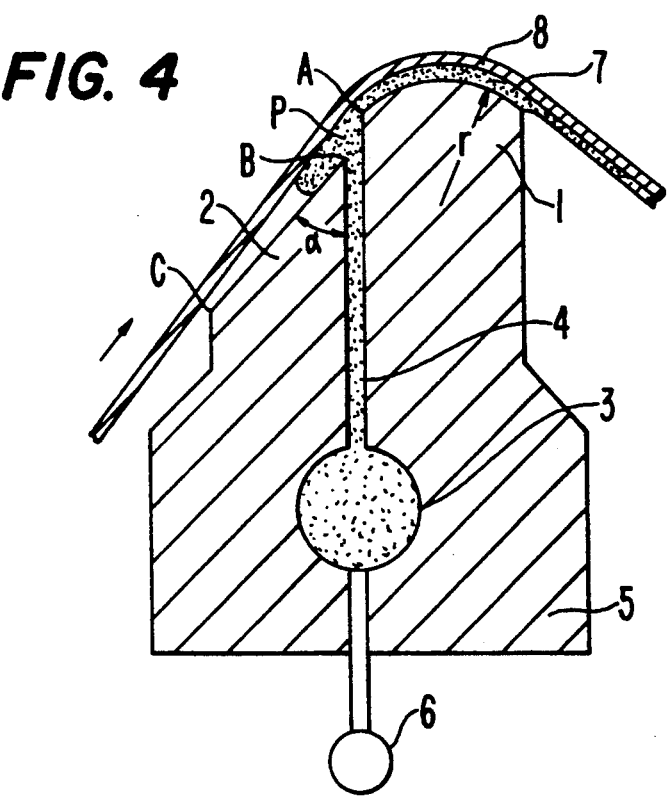

As understood, when the coating speed is more than 100 m/min or the thickness of the coating is less than 10 μm in the liquid state, the air accompanying by the running base film is mixed within the coating liquid delivered from the slit thus interrupting the operation of coating. Then, as shown in FIG. 4, the loading angle of the base film onto the front lip 2 surface is chosen so that the base film can run closer to the front lip 2 than the tangent line at the edge point A of the rear lip 1, whereby the coating liquid trapped in a liquid pocket P defined by the slit outlet and the front lip 2 will be maintained under pressure and thus, the mixing of air into the coating liquid will be avoided. Hence, the development of a thin film having a thickness of less than 10 μm becomes feasible during coating at a high speed of more than 100 m/min. Simultaneously, to prevent the base film from coming into direct contact with the surface of the front lip 2 which results in injury to the base film surface, the vertical angle $\alpha$ of the side line BC of the front lip 2 from the slit depth line is adjusted to $30° < \alpha < 80°$ while the lip top end B is 2 to 100 μm lower than the line tangent at the point A.

The front and rear lips are preferably made of carbide alloy metal so that their surfaces can be finished with a degree of straightness or flatness on the order of a few micrometers and also, the generation of burr or sag at the slit edge of the rear lip 1 which is commonly encountered during the processing of stainless steel can be avoided. As a result, during the development of a thin coating, no widthwise variation in the thickness will occur and no stripe pattern of uneven coating on the coating surface caused by the existence of burr or sag at the edge will be produced, ensuring the consistency of satisfactory coating.

According to the second embodiment, a tape was fabricated by applying the magnetic coating liquid shown in Table 1 onto a polyethylene-terephthalate film 14 μm thick at a coating speed of 200 m/min and finishing it with calendering. The coating surface of the tape was then measured by a 3-dimension surface profile analyzer and the result was similar to that of the first embodiment.

FIG. 5 illustrates a coating apparatus of a third embodiment of the present invention, in which the front lip 2 is different in its structural arrangement from both the first and second embodiments. The front lip 2 is provided with a base film side surface thereof which is formed in a planar configuration and parallel to the tangent line at the end point A thereof. Also, its planar surface is recessed from the base film path so that the distance d from the tangent line ranges 2 to 100 μm. This is for the following reason.

As will be understood, when the coating speed is more than 100 m/min or the thickness of a coating is less than 10 μm in the liquid state, the air accompanying by the running base film is mixed within the coating liquid delivered from the slit thus interrupting the operation of coating. Then, as shown in FIG. 6, the loading angle of the base film to the front lip 2 is chosen so that the angle $\phi$ between the base film path and the tangent line at the point A of the rear lip 1 is in a range of $0.5° < \phi < 5°$. Thereby, the coating liquid trapped in a liquid pocket P defined by the slit outlet and the front lip 2 will be maintained under pressure and thus, the mixing of air into the coating liquid will be avoided. Also, the development of a thin film having a thickness of less than 10 μm becomes feasible during the coating at a high speed of more than 100 m/min. Simultaneously, to prevent the base film from coming into direct contact with the surface of the front lip 2 which results in injury of the base film surface, the planar surface of the front lip 2 is recessed from the base film path and spaced by the distance d from the tangent line.

The front and rear lips are preferably made of carbide alloy metal so that their surfaces can be finished with a degree of straightness or flatness on the order of a few micrometers and also, the generation of burr or sag at the slit edge of the rear lip 1 which is commonly encountered during the processing of stainless steel can be avoided. As a result, during the development of a thin coating, no widthwise variation in the thickness will occur and no stripe pattern of uneven coating on the coating surface caused by the existence of burr or sag at the edge will occur, ensuring the consistency of satisfactory coating.

According to the third embodiment, a tape was fabricated by applying the magnetic coating liquid shown in Table 1 onto a polyethylene-terephthalate film 14 μm thick at a coating speed of 200 m/min and finishing it with calendering. The coating surface of the tape was then measured by a 3-dimension surface profile analyzer and the result was similar to that of the first and second embodiment.

What is claimed is:

1. A coating apparatus for continuously applying a coating liquid, comprising:

a die nozzle having a front lip and a rear lip which are spaced to form therebetween a slit extending into said die nozzle away from said lips, said slit opening onto a front surface of a base film which runs over said lips while being spaced at a distance from said die nozzle and in a direction from said front lip to said rear lip, said coating apparatus being free of any base film supporting structure at a position corresponding to a back surface of the base film, said rear lip having a curved convex surface facing the base film and the sectional profile in the direction from said front to said rear lip having a slit end point A at an intersection of said slit and said rear lip surface, and said front lip having a curved convex surface facing the base film and the sectional profile in the direction from said front to said rear lip having a slit end point B at an intersection of said slit and said front lip surface, said end point B being spaced in the direction in which said slit extends into said die nozzle from said point A, and an angle between a first line tangent to the curved convex surface of said rear lip at said point A and a second line tangent to the curved convex surface of said front lip at said point B being less than 45°.

2. A coating apparatus for continuously applying a coating liquid, comprising:

a die nozzle having a front lip and a rear lip which are spaced to form therebetween a slit extending into said die nozzle away from said lips, said slit opening onto a front surface of a base film which runs over said lips while being spaced at a distance from said die nozzle and in a direction from said front lip to said rear lip, said coating apparatus being free of any base film supporting structure at a position corresponding to a back surface of the base film, said rear lip having a curved convex surface facing the base film and the sectional profile in the direction from said front to said rear lip having a slit end point A at an intersection of said slit and said rear lip surface, and said front lip having a planar surface facing the base film and the sectional profile in the direction from said front to said rear lip having a slit end point B at an intersection of said slit and said front lip surface and an opposite end point C spaced along said front lip from said point B, said planar surface being spaced in a direction in which said slit extends into said die nozzle from a first line tangent to the curved convex surface of said rear lip at said point A, and said planar surface and a longitudinal axis of said slit extending in the direction in which said slit extends into said die nozzle being at an angle of from 30° to 80°.

3. A coating apparatus as claimed in claim 2 in which said planar surface and said first line are parallel.

* * * * *